(12) United States Patent
Ishikawa et al.

(10) Patent No.: US 9,935,533 B2
(45) Date of Patent: Apr. 3, 2018

(54) SQUIRREL-CAGE MOTOR ROTOR AND SQUIRREL-CAGE MOTOR

(71) Applicant: MITSUBISHI ELECTRIC CORPORATION, Chiyoda-ku, Tokyo (JP)

(72) Inventors: Hiroshi Ishikawa, Tokyo (JP); Yoshiharu Takashima, Tokyo (JP); Yoshiki Okada, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 41 days.

(21) Appl. No.: 15/118,709

(22) PCT Filed: Dec. 25, 2014

(86) PCT No.: PCT/JP2014/084240
§ 371 (c)(1),
(2) Date: Aug. 12, 2016

(87) PCT Pub. No.: WO2015/151362
PCT Pub. Date: Aug. 10, 2015

(65) Prior Publication Data
US 2017/0054351 A1 Feb. 23, 2017

(30) Foreign Application Priority Data
Mar. 31, 2014 (JP) .................. 2014-070716

(51) Int. Cl.
*H02K 17/16* (2006.01)
*H02K 15/00* (2006.01)
*H02K 1/12* (2006.01)
(52) U.S. Cl.
CPC ............. *H02K 17/165* (2013.01); *H02K 1/12* (2013.01); *H02K 15/0012* (2013.01)

(58) Field of Classification Search
CPC ............. H02K 1/12; H02K 1/28; H02K 17/16; H02K 17/165; H02K 17/18; H02K 15/00;
(Continued)

(56) References Cited

U.S. PATENT DOCUMENTS 1,823,337 A * 9/1931 Sheely ................. H02K 17/165
310/212
3,535,568 A * 10/1970 Haverkamp ......... H02K 7/1028
310/172
(Continued)

FOREIGN PATENT DOCUMENTS

JP 62-71459 A 4/1987
JP 1-133546 A 5/1989
(Continued)

OTHER PUBLICATIONS

International Search Report (PCT/ISA/210) dated Mar. 10, 2015, by the Japanese Patent Office as the International Searching Authority for International Application No. PCT/JP2014/084240.
(Continued)

*Primary Examiner* — Tran Nguyen
(74) *Attorney, Agent, or Firm* — Buchanan Ingersoll & Rooney PC

(57) ABSTRACT

This squirrel-cage motor rotor includes a plurality of conductor bars provided at regular intervals along the circumferential direction of a rotor core, short-circuit rings connected to ends of the conductor bars, and reinforcement covers having axial-direction surfaces being in contact with axial-direction-end surfaces of the short-circuit rings. The reinforcement covers are enclosed by casting in the short-circuit rings. Holding rings are attached to the outer circumferential surfaces of the flange portions of the reinforcement covers and the outer circumferential surfaces of the short-circuit rings by interference fit.

12 Claims, 13 Drawing Sheets

(58) Field of Classification Search
CPC .... H02K 15/0012; H02K 15/06; H02K 15/12; H02K 15/16; H02K 21/00; H02K 21/14; H02K 21/46
See application file for complete search history.

(56) References Cited

U.S. PATENT DOCUMENTS

| | | | | |
|---|---|---|---|---|
| 3,662,200 | A * | 5/1972 | Rank | H02K 1/30 |
| | | | | 310/211 |
| 4,309,635 | A * | 1/1982 | Sei | H02K 17/165 |
| | | | | 310/125 |
| 4,970,424 | A * | 11/1990 | Nakamura | H02K 17/165 |
| | | | | 310/211 |
| 5,952,764 | A * | 9/1999 | Nakamura | B22D 19/0054 |
| | | | | 310/211 |
| 8,946,969 | B2 * | 2/2015 | Dolz | H02K 17/165 |
| | | | | 29/598 |
| 2013/0113331 | A1 | 5/2013 | Doelz | |
| 2013/0193811 | A1 * | 8/2013 | Chamberlin | H02K 15/0012 |
| | | | | 310/60 R |
| 2013/0207505 | A1 * | 8/2013 | Kajiya | H02K 15/02 |
| | | | | 310/211 |

FOREIGN PATENT DOCUMENTS

| | | |
|---|---|---|
| JP | 6-153471 A | 5/1994 |
| JP | 7-23549 A | 1/1995 |
| JP | 9-28064 A | 1/1997 |
| JP | 2012-244824 A | 12/2012 |

OTHER PUBLICATIONS

Written Opinion (PCT/ISA/237) dated Mar. 10, 2015, by the Japanese Patent Office as the International Searching Authority for International Application No. PCT/JP2014/084240.

* cited by examiner (a)

(b)

(a)

200

(b)

200

(a)

(b)

(a)

(b)

(a)

(b)

SQUIRREL-CAGE MOTOR ROTOR AND SQUIRREL-CAGE MOTOR

TECHNICAL FIELD

The present invention relates to a squirrel-cage motor rotor having a conductor bar and a short-circuit ring, and a squirrel-cage motor, and particularly, to a squirrel-cage motor rotor and a squirrel-cage motor which are used for a spindle motor of a machine tool, or the like, and which rotate at a high speed.

BACKGROUND ART

A conventional squirrel-cage motor rotor is composed of a cylindrical rotor core formed by stacking electromagnetic steel sheets, a plurality of conductor bars provided in respective slots of the rotor core, and short-circuit rings (end rings) connected to the ends on both sides of the conductor bars, and the rotor is attached to a rotor shaft of a motor by shrink fit.

In recent years, a squirrel-cage motor used for a spindle motor of a machine tool, or the like, is required to have high performance, and is required to be capable of high-speed rotation at several tens of thousands of revolutions/minute.

In order to improve the efficiency of such a squirrel-cage motor that rotates at a high speed, aluminum comes to be used for the conductor bars and the short-circuit rings which are conductors of the rotor (hereinafter, referred to as rotor conductors).

The squirrel-cage motor rotor that rotates at a high speed is, due to the structure thereof, subjected to a great centrifugal force when rotating at a high speed. In addition, due to heat generation during operation, the rotor conductor thermally expands. That is, due to the action of the centrifugal force and the thermal expansion, the short-circuit ring is deformed, and stress occurs on the short-circuit ring.

When the squirrel-cage motor is repeatedly driven and stopped, application and cancellation of stress on the short-circuit ring are repeated. That is, the short-circuit ring is repeatedly subjected to stress, to undergo metal fatigue.

Particularly, in the case of using, as the rotor conductors, aluminum which is low in strengths such as proof stress and tensile strength and is comparatively great in the coefficient of thermal expansion, deformation of the short-circuit ring increases, and the caused stress also increases. In addition, there is a possibility of reduction in the fatigue strength of the short-circuit ring.

A squirrel-cage motor rotor is proposed which can prevent deformation of the short-circuit ring due to a centrifugal force and heat though aluminum is used for rotor conductors. This rotor includes aluminum-cast-type rotor bars (conductor bars) formed by being cast into outer circumferential slots of a rotor iron core (rotor core); and aluminum-cast-type short-circuit rings provided at both ends of the rotor bars. A holding ring made of steel or the like is attached to the outer circumference of each short-circuit ring by shrink fit, and a plate lock (reinforcement cover) for holding and reinforcing the outer ends of the short-circuit ring and the holding ring is provided in a rotor shaft via a boss (for example, see Patent Document 1).

Another squirrel-cage motor rotor is proposed in which, although aluminum is used for rotor conductors, the amplitude of the repetitive stress caused by repetition of driving and stop is reduced, thus preventing metal fatigue. This rotor includes a cylindrical iron core portion (rotor core); conductor bars arranged at constant intervals along the circumferential direction inside the iron core portion; short-circuit rings connected to the conductor bars and provided at both end surfaces of the iron core portion; and reinforcement rings (reinforcement rings) the outer diameter of which is greater than the inner diameter of the short-circuit rings. The reinforcement ring is shrink-fitted to the inner circumference of each short-circuit ring, and a shaft (rotor shaft) is attached to the inner circumferences of the iron core portion and the reinforcement ring (for example, see Patent Document 2).

CITATION LIST

Patent Document

Patent Document 1: Japanese Laid-Open Patent Publication No. 6-153471 (page 2, FIG. 3)
Patent Document 2: Japanese Laid-Open Patent Publication No. 2012-244824 (page 4, FIG. 1)

SUMMARY OF THE INVENTION

Problems to be Solved by the Invention

A short-circuit ring is deformed in the outer circumference direction by a centrifugal force applied to a rotor when a squirrel-cage motor rotates at a high speed. The deformation amount of the short-circuit ring is greater at a part closer to the inner circumferential side, and is smaller at a part closer to the outer circumferential side. That is, tensile stress is greater at a part closer to the inner circumferential side of the short-circuit ring, and tensile stress in the circumferential direction is greater than tensile stress in the radial direction.

Although the short-circuit ring thermally expands due to heat generation by the rotor conductors and thereby is deformed, since the conductor bars connected to the short-circuit ring are restrained by the rotor core which less thermally expands than the short-circuit ring, deformation in the outer circumference direction and the axial direction of the short-circuit ring is restrained, so that stress in the compression direction occurs on the short-circuit ring.

In the case where driving and stop of the squirrel-cage motor are repeated, immediately after the stop, the rotor conductors have a high temperature and therefore the short-circuit ring thermally expands to be deformed and is subjected to stress in the compression direction, and in contrast, during driving, the short-circuit ring is subjected to stress in the tensile direction due to a centrifugal force.

The tensile stress in the circumferential direction due to a centrifugal force during driving is greater on the inner circumferential side of the short-circuit ring. Therefore, the amplitude of the repetitive stress is greater at a part closer to the inner circumferential side of the short-circuit ring.

In the rotor described in Patent Document 1, the holding ring made of steel or the like is attached to the outer circumference of the short-circuit ring by shrink fit, whereby deformation of the short-circuit ring can be prevented. However, the inner circumferential side of the short-circuit ring is not restrained, and therefore great tensile stress in the circumferential direction acting on the inner circumferential side of the short-circuit ring due to a centrifugal force applied to the rotor cannot be reduced.

That is, the amplitude of the repetitive stress caused on the short-circuit ring by repetition of driving and stop of the squirrel-cage motor cannot be reduced, thus causing a problem that the short-circuit ring is likely to undergo metal fatigue.

In the rotor described in Patent Document 2, the reinforcement ring the outer diameter of which is greater than the inner diameter of the short-circuit ring is attached to the inner circumference of the short-circuit ring by shrink fit, whereby such a force as to expand and deform the short-circuit ring outward in the radial direction is applied to the short-circuit ring, and thus tensile stress in the circumferential direction is applied to the inner circumferential portion of the short-circuit ring even when a centrifugal force is not applied. Therefore, between the case in which a centrifugal force is not applied and the case in which a centrifugal force is applied, a difference in the tensile stress in the circumferential direction on the inner circumferential portion of the short-circuit ring is small.

That is, the amplitude of the repetitive stress caused on the inner circumferential portion of the short-circuit ring by repetition of driving and stop of the squirrel-cage motor is reduced, whereby breakage of the short-circuit ring due to metal fatigue is prevented.

However, since the outer circumferential side of the short-circuit ring is not restrained, thermal expansion and deformation of the short-circuit ring in the radial direction cannot be suppressed, and the effect of the shrink fit decreases with increase in the temperature.

In a process for attaching the iron core portion and the reinforcement ring to the rotor shaft by shrink fit, if shrink fit is performed at a temperature exceeding the assumed temperature, a difference in the thermal expansion deformation amount between the short-circuit ring and the reinforcement ring exceeds the shrink-fit allowance, thus a problem exists in that the reinforcement ring is detached or displaced.

The present invention has been made to solve the above problems, and an object of the present invention is to suppress deformation in the radial direction of the short-circuit ring and prevent the reinforcement cover from being detached or displaced. Further, an object of the present invention is to provide a squirrel-cage motor rotor in which the reinforcement ring is prevented from being detached or displaced, and the amplitude of the repetitive stress caused on the short-circuit ring by repetition of driving and stop of the squirrel-cage motor is reduced, whereby breakage of the short-circuit ring due to metal fatigue is prevented. Further an object of the present invention is to provide a squirrel-cage motor using this rotor and having excellent reliability.

Means of Solution to the Problems

A first squirrel-cage motor rotor according to the present invention includes conductor bars filling a plurality of slot holes provided at regular intervals along a circumferential direction of a rotor core, short-circuit rings connected to ends of the conductor bars, and reinforcement covers being in contact with axial-direction-end surfaces of the short-circuit rings. And the conductor bars and the short-circuit rings are integrally formed by casting, the reinforcement covers are cylindrical members having body portions and annular flange portions vertically protruding from outer circumferential surfaces of the body portions, outer circumferential surfaces of the body portions and inner circumferential surfaces of the short-circuit rings are in contact with each other, and holding rings are attached by interference fit such that inner circumferential surfaces thereof are in contact with outer circumferential surfaces of the flange portions and the short-circuit rings.

A second squirrel-cage motor rotor according to the present invention includes conductor bars filling a plurality of slot holes provided at regular intervals along a circumferential direction of a rotor core, short-circuit rings connected to ends of the conductor bars, and reinforcement covers being in contact with axial-direction-end surfaces of the short-circuit rings. And the conductor bars and the short-circuit rings are integrally formed by casting, the reinforcement covers have, in a plan view, the same shape as the axial-direction-end surfaces of the short-circuit rings, and have short-circuit ring projection insertion holes formed at positions opposed to the conductor bars, reinforcement rings are attached by interference fit such that outer circumferential surfaces thereof are in contact with inner circumferential surfaces of the reinforcement covers and the short-circuit rings, and holding rings are attached by interference fit such that inner circumferential surfaces thereof are in contact with outer circumferential surfaces of the reinforcement covers and the short-circuit rings.

A third squirrel-cage motor rotor according to the present invention includes conductor bars filling a plurality of slot holes provided at regular intervals along a circumferential direction of a rotor core, short-circuit rings connected to ends of the conductor bars, and reinforcement covers being in contact with axial-direction-end surfaces of the short-circuit rings. And the conductor bars and the short-circuit rings are integrally formed by casting, the reinforcement covers are cylindrical members having body portions and annular flange portions vertically protruding from inner circumferential surfaces of the body portions, inner circumferential surfaces of the body portions are attached so as to be in contact with outer circumferential surfaces of the short-circuit rings by interference fit, and reinforcement rings are attached by interference fit such that outer circumferential surfaces thereof are in contact with inner circumferential surfaces of the flange portions and the short-circuit rings.

A squirrel-cage motor according to the present invention is configured by using, as a rotor thereof, any one of the first to third squirrel-cage motor rotors.

Effect of the Invention

Since a rotor according to the present invention is configured as described above, deformation of a short-circuit ring in the radial direction can be suppressed, and a reinforcement cover can be prevented from being detached or displaced. Further, while a reinforcement ring can be prevented from being detached or displaced, the amplitude of the repetitive stress generated on the short-circuit ring by repetition of driving and stop of a motor is reduced, whereby breakage of the short-circuit ring due to metal fatigue can be prevented.

In a squirrel-cage motor using this rotor, disadvantages that would occur on the rotor during usage are decreased, and thus the reliability is improved.

EMBODIMENTS FOR CARRYING OUT THE INVENTION

Embodiment 1

Figure 1:
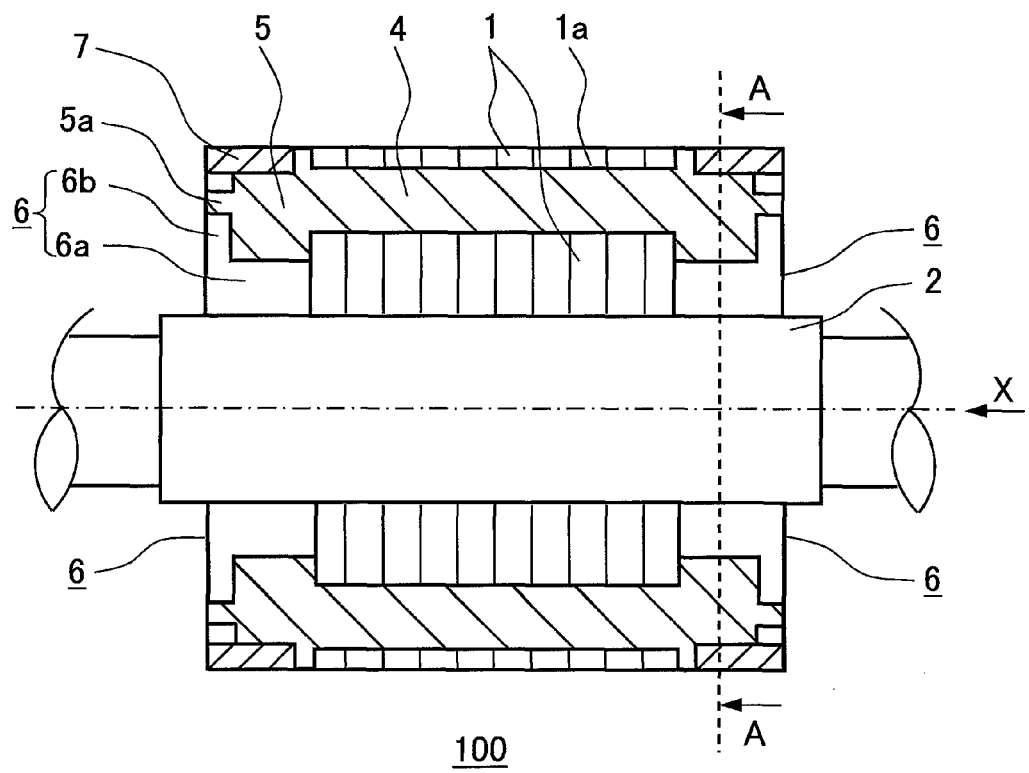
FIG. 1 is a schematic sectional view of a squirrel-cage motor rotor according to embodiment 1 of the present invention.

FIG. 1 is a schematic sectional view of a squirrel-cage motor rotor according to embodiment 1 of the present invention.

Figure 2:
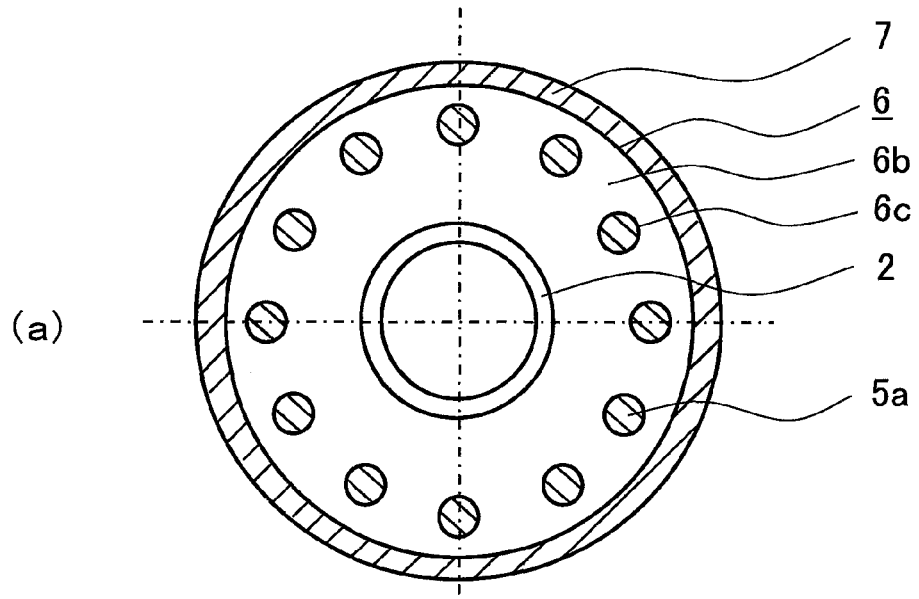
FIG. 2 is a schematic plan view (a) as seen from the direction indicated by an arrow X and a schematic view (b) of an A-A cross section, of the squirrel-cage motor rotor according to embodiment 1 of the present invention shown in FIG. 1.
Figure 2:
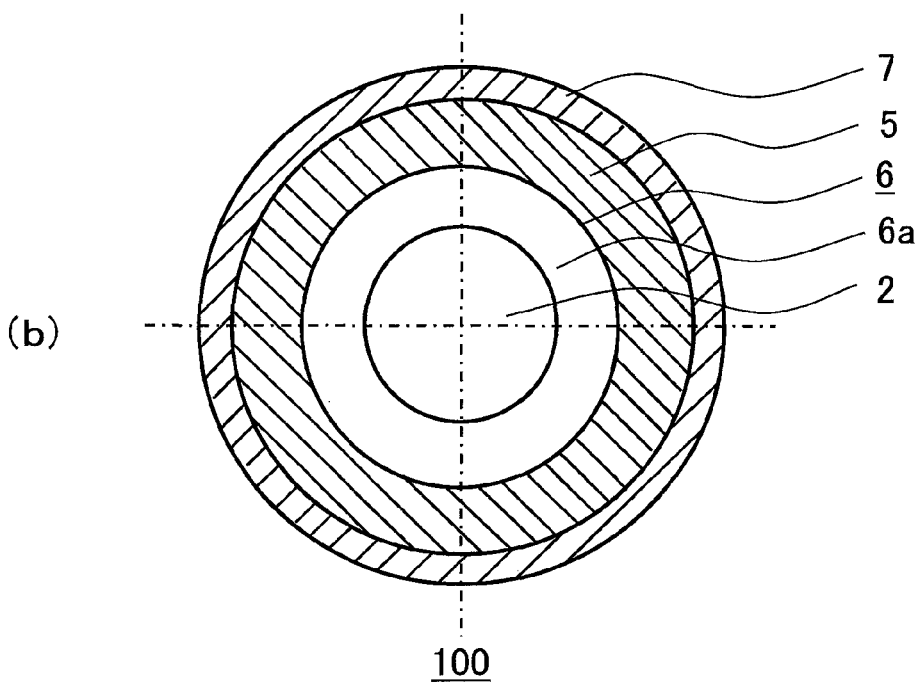

FIG. 2 is a schematic plan view (a) as seen from the direction indicated by an arrow X and a schematic view (b) of an A-A cross section, of the squirrel-cage motor rotor according to embodiment 1 of the present invention shown in FIG. 1.

FIG. 2 shows a plan view and a sectional view of the entirety of a squirrel-cage motor rotor 100 of the present embodiment.

As shown in FIG. 1 and FIG. 2, the squirrel-cage motor rotor 100 of the present embodiment includes a cylindrical rotor core 1 formed by stacking electromagnetic steel sheets, conductor bars 4 respectively filling a plurality of slot holes 1a which penetrate the rotor core 1 in the axial direction and are arranged at regular intervals along the circumferential direction of the rotor core 1, short-circuit rings 5 connected to ends of the conductor bars 4, reinforcement covers 6 contacting with axial-direction-end surfaces of the short-circuit rings 5 and having a hole at the center, and a rotor shaft 2 to which the rotor core 1 is attached.

In the squirrel-cage motor rotor 100 of the present embodiment, the short-circuit rings 5 are integrated with all the conductor bars 4 arranged at regular intervals along the circumferential direction of the rotor core 1, and are provided at both-side ends of the conductor bars 4 so as to contact with the axial-direction-end surfaces of the rotor core 1.

Each reinforcement cover 6 is a cylindrical member having a body portion 6a and an annular flange portion 6b vertically protruding from the outer circumferential surface on one axial-direction-end side of the body portion 6a. The shape of a cross section perpendicular to the circumferential direction of the cylindrical member is an L-shape, and the reinforcement covers 6 are attached to the rotor shaft 2.

Regarding the reinforcement cover 6, the outer circumferential surface of the body portion 6a is in contact with the inner circumferential surface of the short-circuit ring 5, the axially-inner-side end surface of the body portion 6a is in contact with the axially-end surface of the rotor core 1, the inner circumferential surface of the body portion 6a is in contact with the outer circumferential surface of the rotor shaft 2, and the axially-inner-side surface of the flange portion 6b is in contact with the axially-end surface of the short-circuit ring 5. In the flange portion 6b of the reinforcement cover 6, at positions opposed to the conductor bars 4, holes (hereinafter, referred to as short-circuit ring projection insertion holes) 6c are formed into which axial-direction projections 5a of the short-circuit ring 5 are inserted.

A holding ring 7 is provided such that the inner circumferential surface thereof is in contact with the outer circumferential surface of the short-circuit ring 5 and the outer circumferential surface of the flange portion 6b of the reinforcement cover 6.

The materials of components of the squirrel-cage motor rotor 100 in the present embodiment will be described.

As described above, an electromagnetic steel sheet is used for a core piece forming the rotor core 1. Aluminum is used for the conductor bars 4 and the short-circuit rings 5. The conductor bars 4 and the short-circuit rings 5 are integrally formed by casting. Stainless steel which is smaller in the coefficient of thermal expansion than that of aluminum and is a non-magnetic material is used for the reinforcement covers 6. Chromium molybdenum steel (SCM) which has a coefficient of thermal expansion almost equal to that of stainless steel and has a high tensile strength is used for the holding rings 7.

An example of the method for manufacturing the squirrel-cage motor rotor 100 of the present embodiment will be described.

By a predetermined processing method, the rotor core 1, the reinforcement covers 6, the holding rings 7, and the rotor shaft 2 are made.

Next, the conductor bars 4 and the short-circuit rings 5 are mounted to the rotor core 1 by casting.

Figure 3:
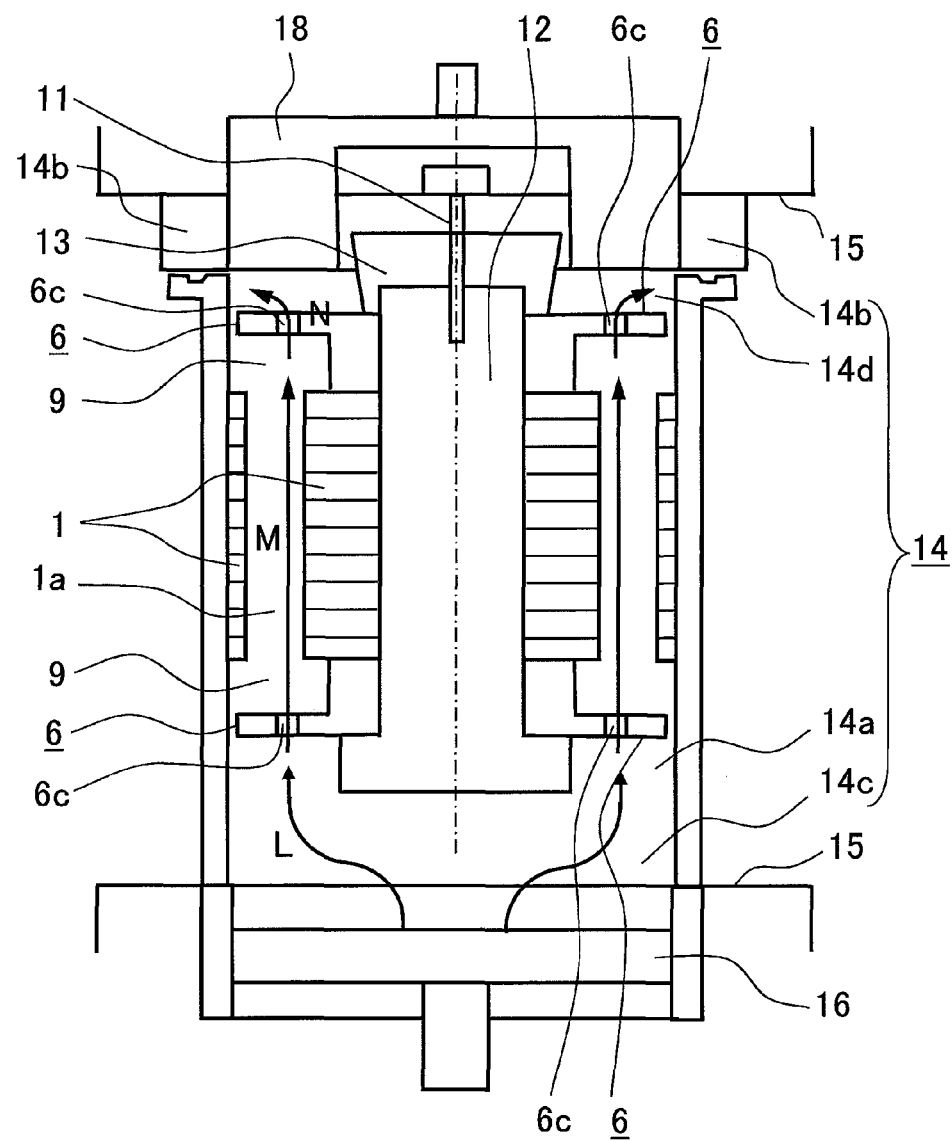
FIG. 3 is a schematic view illustrating means for mounting conductor bars and short-circuit rings to a rotor core by casting, in the squirrel-cage motor rotor according to embodiment 1 of the present invention.

FIG. 3 is a schematic view illustrating means for mounting the conductor bars and the short-circuit rings to the rotor core by casting, in the squirrel-cage motor rotor according to embodiment 1 of the present invention.

FIG. 3 shows an example of means for mounting the conductor bars 4 and the short-circuit rings 5 to the rotor core 1 by casting.

First, from the lower side, the lower reinforcement cover 6, the rotor core 1, and the upper reinforcement cover 6 are set in this order to a temporary shaft component 12.

Next, as shown in FIG. 3, the temporary shaft component 12 to which the reinforcement covers 6 and the rotor core 1 are set is fixed to an end block 14b of a mold 14 by a bolt 11 via a pressor foot 13, whereby the reinforcement covers 6 and the rotor core 1 are placed in a cavity 14a of the mold 14.

Next, the mold 14 is set on a die-casting machine 15.

In the present embodiment, the die-casting machine 15 is a vertical type.

Next, a piston 16 of the die-casting machine 15 lifts to inject molten aluminum into the cavity 14a through a sprue 14c of the mold 14, as indicated by arrows L.

The molten aluminum injected into the cavity 14a passes through the short-circuit ring projection insertion holes 6c formed in the flange portion 6b of the lower reinforcement cover 6, and then fills a short-circuit ring part 9 on the lower reinforcement cover side. Further, as indicated by arrows M, the molten aluminum fills all the slot holes 1a penetrating the rotor core 1 in the axial direction and arranged at regular intervals along the circumferential direction of the rotor core 1. Further, after passing through the slot holes 1a, the molten aluminum fills a short-circuit ring part 9 on the upper reinforcement cover side, and then, as indicated by arrows N, the molten aluminum passes through the short-circuit ring projection insertion holes 6c formed in the flange portion 6b of the upper reinforcement cover 6 and fills a runner portion 14d of the mold 14.

Since the molten aluminum flows in the cavity 14a as described above, gas involved with the molten aluminum finally gathers into the runner portion 14d, thus preventing a void from being generated due to the gas in the aluminum of the short-circuit ring part 9 and the slot hole 1a part.

The die-casting machine 15 of the present embodiment includes a partial pressure cylinder. As shown in FIG. 3, while the molten aluminum is solidified, the entire molten aluminum can be pressurized by a plunger 18 connected to the partial pressure cylinder from the upper side of the runner portion 14d.

Therefore, for example, even if a gas space occurs in the short-circuit ring or shrinkage occurs at a part that is solidified slowly, the gas space or the shrinkage is eliminated by the pressure, and thus occurrence of a casting defect such as a bubble defect or a nest defect can be prevented.

Next, the molten aluminum in the mold is cooled and solidified.

Figure 4:
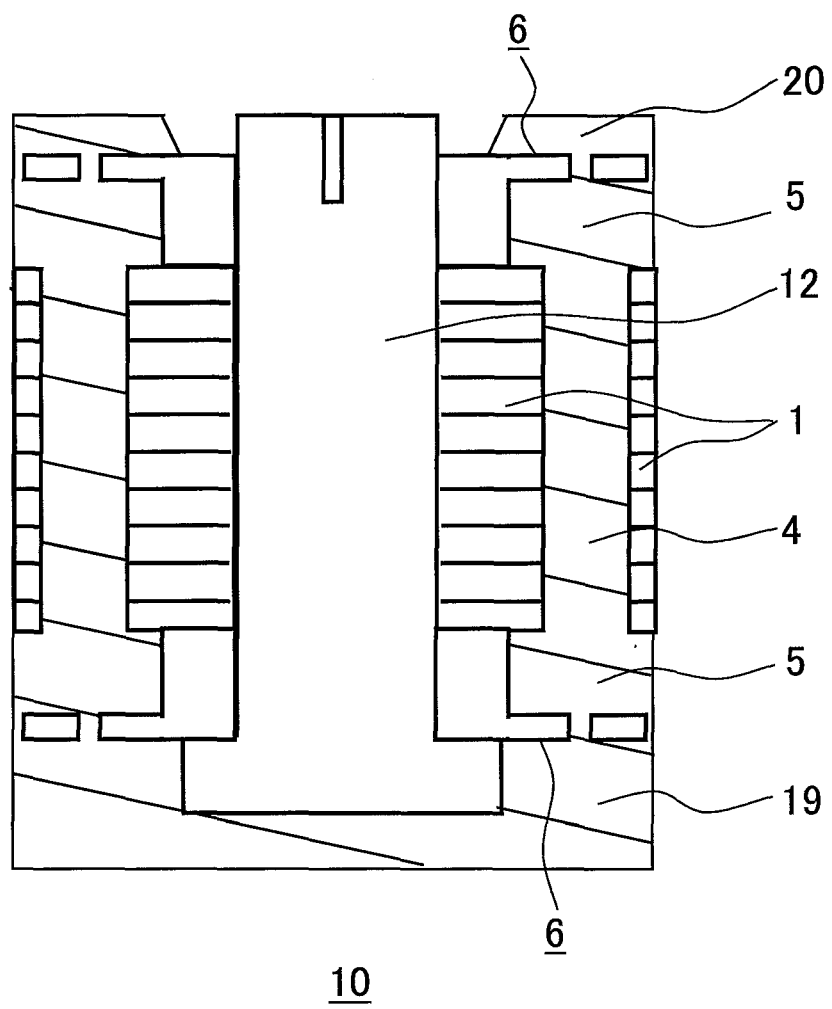
FIG. 4 is a schematic sectional view showing a sealed body in which the rotor core and the reinforcement cover are sealed by aluminum, when extracted from a mold after molten aluminum has been solidified, in the squirrel-cage motor rotor according to embodiment 1 of the present invention.

FIG. 4 is a schematic sectional view showing a sealed body in which the rotor core and the reinforcement cover are sealed by aluminum, when extracted from the mold after the molten aluminum has been solidified, in the squirrel-cage motor rotor according to embodiment 1 of the present invention.

In FIG. 4, the temporary shaft component 12 is also shown.

Next, a sprue shaped portion 19 and a runner shaped portion 20 are cut and removed from a sealed body 10 in which the rotor core 1 and the reinforcement cover 6 are sealed by aluminum as shown in FIG. 4.

Next, after the temporary shaft component 12 is detached, the outer circumferential portion of the flange portion 6b of each reinforcement cover 6 and the outer circumferential portion of each short-circuit ring 5 which are located on both sides in the axial direction and are enclosed by casting in aluminum are cut together by a lathe so that their outer diameters become equal to each other. At this time, the outer diameter of the flange portion 6b of the reinforcement cover 6 and the outer diameter of the short-circuit ring 5 are made greater than the inner diameter of the holding ring 7 by an amount corresponding to the shrink-fit allowance. Next, the holding ring 7 is attached to the outer circumferential surfaces of the reinforcement cover 6 and the short-circuit ring 5 which have outer diameters equal to each other, by shrink fit.

Next, the inner circumferential surface of the rotor core 1 and the inner circumferential surface of each reinforcement cover 6 are cut together by a lathe so that their inner diameters become equal to each other. At this time, the inner diameter of the rotor core 1 and the inner diameter of each reinforcement cover 6 are made smaller than the outer diameter of the rotor shaft 2 by an amount corresponding to the shrink-fit allowance. Next, the rotor core 1 and the reinforcement covers 6 are attached to the rotor shaft 2 at the same time by shrink fit, whereby the squirrel-cage motor rotor 100 is completed.

In the squirrel-cage motor rotor 100 of the present embodiment, the body portion 6a of each reinforcement cover 6 is enclosed by casting in the short-circuit ring 5. The coefficient of thermal expansion of the aluminum that forms the enclosing short-circuit ring 5 is greater than that of the stainless steel that forms the enclosed reinforcement cover 6. Therefore, the contraction amount of the short-circuit ring 5 in a process in which the short-circuit ring 5 is solidified from a liquid state and then cooled is greater than the contraction amount of the reinforcement cover 6.

Here, since the inner circumferential surface of the short-circuit ring 5 is in contact with the outer circumferential surface of the body portion 6a of the reinforcement cover 6, the short-circuit ring 5 cannot be fully contracted, so that the short-circuit ring 5 embraces the reinforcement cover 6 so as to be tightened. Thus, as in the case where the reinforcement cover 6 is attached by shrink fit, such a force as to expand the short-circuit ring 5 outward in the radial direction is applied to the inner circumferential surface of the short-circuit ring 5.

In addition, since the holding ring 7 is attached with its inner circumferential surface being in contact with the outer circumferential surface of the short-circuit ring 5 by shrink fit, such a force as to contract the short-circuit ring 5 inward in the radial direction is applied to the outer circumferential surface of the short-circuit ring 5. Therefore, the short-circuit ring 5 is pressed by the reinforcement cover 6 and the holding ring 7 from both sides in the radial direction, and expansion and deformation of the short-circuit ring 5 are hindered, whereby compressive stress is applied to the short-circuit ring 5.

In addition, since the axial direction-end surfaces of the short-circuit ring 5 are also restrained by the reinforcement covers 6, expansion and deformation of the short-circuit ring 5 in the axial direction are also hindered.

That is, since the short-circuit ring 5 to be expanded and deformed due to at least one of temperature increase and centrifugal force load is restrained and pressed by the reinforcement cover 6 and the holding ring 7 in three directions, compressive stress is constantly applied to the short-circuit ring 5.

Therefore, in the squirrel-cage motor rotor 100 of the present embodiment, the amplitude of stress generated on the short-circuit ring 5 by repetition of driving and stop of the motor is small, and the life against metal fatigue of the short-circuit ring 5 can be improved.

In addition, in the squirrel-cage motor rotor 100 of the present embodiment, since the holding ring 7 is attached to the outer circumferential surfaces of the short-circuit ring 5 and the flange portion 6b of the reinforcement cover 6 by shrink fit, thermal expansion and deformation of the short-circuit ring 5 outward in the radial direction due to temperature increase are hindered. In addition, the body portion 6a of the reinforcement cover 6 is enclosed by casting in the short-circuit ring 5.

That is, the outer circumferential surface of the flange portion 6b of the reinforcement cover 6 is tightened by the holding ring 7, and the outer circumferential surface of the body portion 6a of the reinforcement cover 6 is tightened by the short-circuit ring 5.

Therefore, in the case where the rotor core 1 and the reinforcement cover 6 are attached to the rotor shaft 2 by shrink fit, even if heating that exceeds an assumed temperature is performed or the temperature of the rotor 100 becomes high due to driving of the squirrel-cage motor, the reinforcement cover 6 is prevented from being loosened to be detached or displaced.

The axial-direction projections 5a of the short-circuit ring 5 are fitted to the short-circuit ring projection insertion holes 6c formed in the flange portion 6b of the reinforcement cover 6. Therefore, when heating is performed for shrink fit to the rotor shaft 2 or the temperature becomes high due to driving of the squirrel-cage motor, the axial-direction projections 5a thermally expand so that the reinforcement cover 6 is strongly held by the short-circuit ring 5, and thus, also in this aspect, the reinforcement cover 6 is prevented from being detached or displaced.

In the squirrel-cage motor rotor of the present embodiment, the components to be attached by shrink fit may be attached by another tightening method such as press fit. That is, the attachment only needs to be made by interference fit.

Embodiment 2

Figure 5:
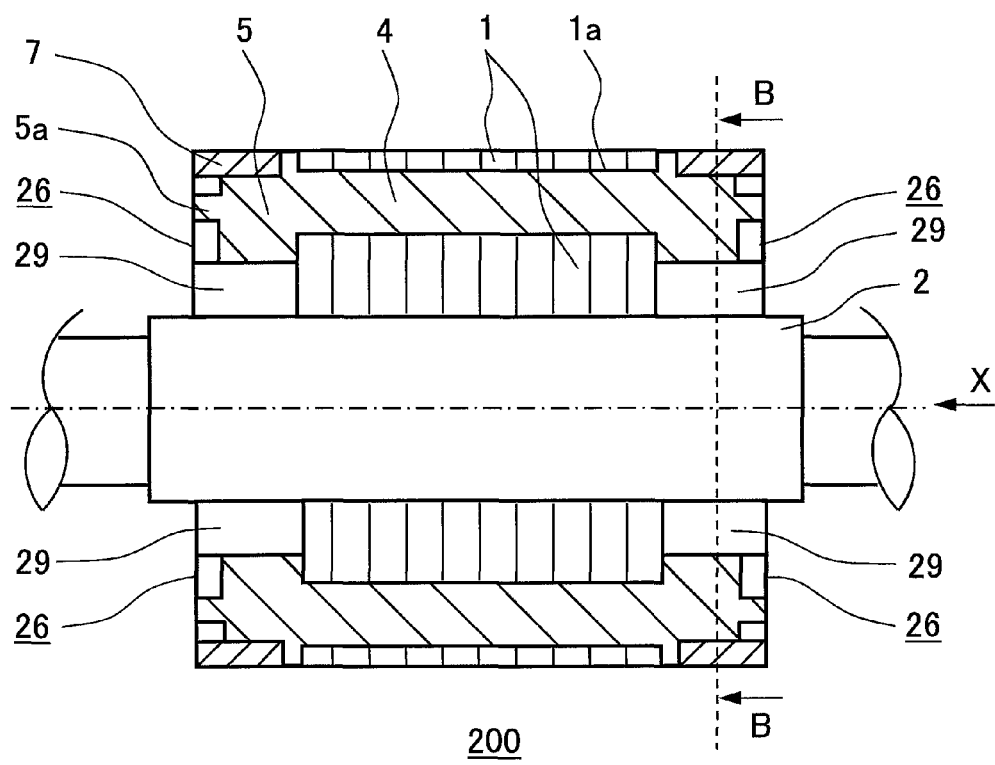
FIG. 5 is a schematic sectional view of a squirrel-cage motor rotor according to embodiment 2 of the present invention.

FIG. 5 is a schematic sectional view of a squirrel-cage motor rotor according to embodiment 2 of the present invention.

Figure 6:
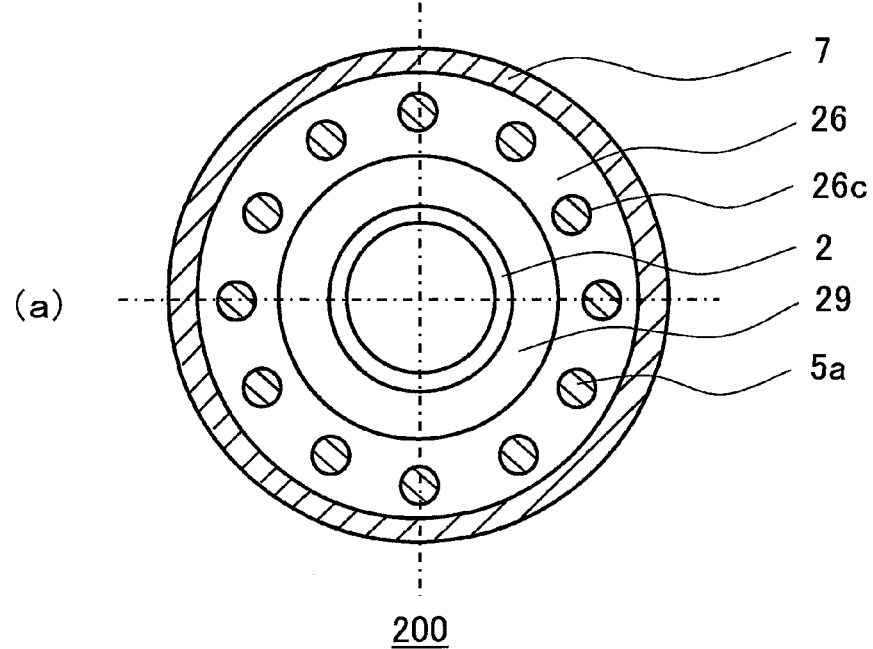
FIG. 6 is a schematic plan view (a) as seen from the direction indicated by an arrow X and a schematic view (b) of a B-B cross section, of the squirrel-cage motor rotor according to embodiment 2 of the present invention shown in FIG. 5.
Figure 6:
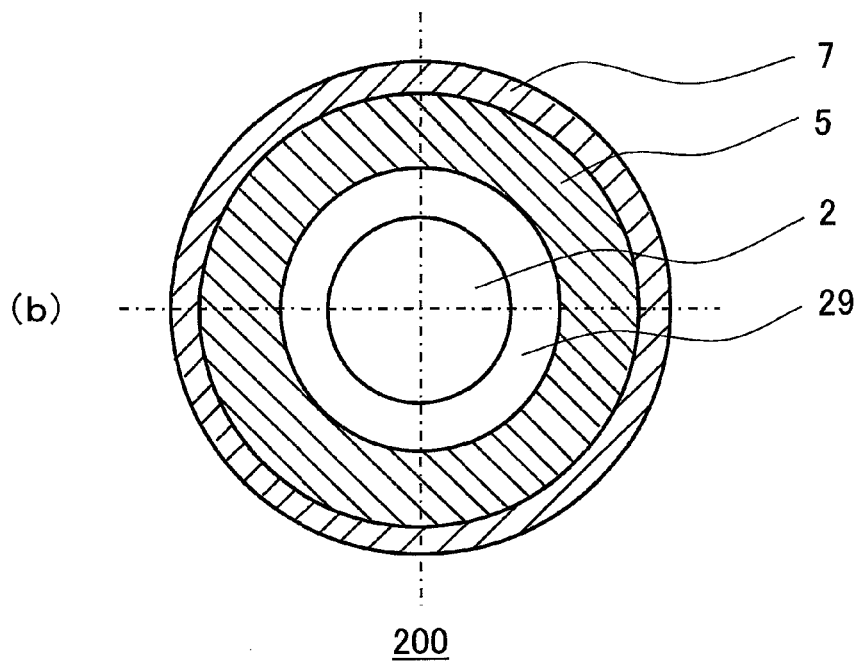

FIG. 6 is a schematic plan view (a) as seen from the direction indicated by an arrow X and a schematic view (b) of a B-B cross section, of the squirrel-cage motor rotor according to embodiment 2 of the present invention shown in FIG. 5.

FIG. 6 shows a plan view and a sectional view of the entirety of a squirrel-cage motor rotor 200 of the present embodiment.

As shown in FIG. 5 and FIG. 6, the squirrel-cage motor rotor 200 of the present embodiment includes a cylindrical rotor core 1 formed by stacking electromagnetic steel sheets, conductor bars 4 respectively filling a plurality of slot holes 1a which penetrate the rotor core 1 in the axial direction and are arranged at regular intervals along the circumferential direction of the rotor core 1, short-circuit rings 5 connected to ends of the conductor bars 4, reinforcement covers 26 contacting with axial-direction-end surfaces of the short-circuit rings 5 and having a hole at the center; and a rotor shaft 2 to which the rotor core 1 is attached.

In the squirrel-cage motor rotor 200 of the present embodiment, the short-circuit rings 5 are integrated with all the conductor bars 4 arranged at regular intervals along the circumferential direction of the rotor core 1, and are provided at both-side ends of the conductor bars 4 so as to contact with the axial-direction-end surfaces of the rotor core 1.

The reinforcement covers 26 have, in a plan view, a doughnut disk shape which is the same as the shape of the axial-direction-end surfaces of the short-circuit rings 5, and have short-circuit ring projection insertion holes 26c formed at portions opposed to the conductor bars 4.

A reinforcement ring 29 is provided such that the outer circumferential surface thereof is in contact with the inner circumferential surface of each short-circuit ring 5 and the inner circumferential surface of each reinforcement cover 26, and the axially-inner-side end surface thereof is in contact with the axial-direction-end surface of the rotor core 1. The reinforcement ring 29 is attached to the rotor shaft 2 such that the inner circumferential surface thereof is in contact with the outer circumferential surface of the rotor shaft 2.

Holding rings 7 are provided such that the inner circumferential surface thereof is in contact with the outer circumferential surface of the short-circuit ring 5 and the outer circumferential surface of the reinforcement cover 26.

In the squirrel-cage motor rotor 200 of the present embodiment, stainless steel which is a nonmagnetic material is used for the reinforcement covers 26, and chromium molybdenum steel (SCM) as in the holding ring 7 is used for the reinforcement rings 29. The materials of the other components are the same as in embodiment 1.

Next, an example of the method for manufacturing the squirrel-cage motor rotor 200 of the present embodiment will be described.

In the same manner as in embodiment 1, a sealed body 10 in which the rotor core 1 and the reinforcement cover 6 are sealed by aluminum as shown in FIG. 4 is made. Next, a sprue shaped portion 19 and a runner shaped portion 20 are cut from the sealed body 10, and then a temporary shaft component 12 is detached.

Next, the outer circumferential portion of the flange portion 6b of each reinforcement cover 6 and the outer circumferential portion of each short-circuit ring 5 which are enclosed by casting in aluminum are cut together by a lathe so that their outer diameters become equal to each other. At this time, the outer diameter of the flange portion 6b and the outer diameter of the short-circuit ring 5 are made greater than the inner diameter of the holding ring 7 by an amount corresponding to the shrink-fit allowance. The outer diameter of the flange portion 6b is the outer diameter of the reinforcement cover 26 described later.

Next, the body portion 6a of each reinforcement cover 6 is cut and removed by a lathe, to make the reinforcement cover 26 having a doughnut disk shape, and the inner circumferential surface of the reinforcement cover 26 and the inner circumferential surface of the short-circuit ring 5 are cut together by a lathe so that their inner diameters become equal to each other. At this time, the inner diameter of the reinforcement cover 26 and the inner diameter of the short-circuit ring 5 are made smaller than the outer diameter of the reinforcement ring 29 by an amount corresponding to the shrink-fit allowance. Next, the reinforcement ring 29 is attached to the inner circumferential surface of the short-circuit ring 5 and the inner circumferential surface of the reinforcement cover 26 by shrink fit.

Next, the holding ring 7 is attached to the outer circumferential surfaces of the short-circuit ring 5 and the reinforcement cover 26 which have outer diameters equal to each other, by shrink fit.

Next, the inner circumferential surface of the rotor core 1 and the inner circumferential surface of each reinforcement ring 29 are cut together by a lathe so that their inner diameters become equal to each other. At this time, the inner diameter of the rotor core 1 and the inner diameter of each reinforcement ring 29 are made smaller than the outer diameter of the rotor shaft 2 by an amount corresponding to the shrink-fit allowance. Next, the rotor core 1 and the reinforcement ring 29 are attached to the rotor shaft 2 at the same time by shrink fit, whereby the squirrel-cage motor rotor 200 is completed.

Also in the squirrel-cage motor rotor 200 of the present embodiment, expansion and deformation of the short-circuit ring 5 due to at least one of temperature increase and centrifugal force load are restrained in three directions of the inner circumferential surface side, the outer circumferential surface side, and the end surface side of the short-circuit ring 5, by the reinforcement ring 29, the holding ring 7, and the reinforcement cover 26, whereby compressive stress is constantly applied to the short-circuit ring 5.

Therefore, also in the squirrel-cage motor rotor 200 of the present embodiment, the amplitude of stress generated on the short-circuit ring 5 by repetition of driving and stop of the motor can be reduced, and the life against metal fatigue of the short-circuit ring 5 can be improved.

In the squirrel-cage motor rotor 200 of the present embodiment, compressive stress applied to the short-circuit ring 5 can be estimated from a set value of the shrink-fit allowance between the short-circuit ring 5 and the reinforcement ring 29, and the amplitude of stress applied to the short-circuit ring 5 can be adjusted depending on the specifications of the squirrel-cage motor. Therefore, there is an advantage that a sufficient life against metal fatigue of the short-circuit ring 5 can be kept irrespective of variation in the specifications such as the rotor size or the rotation rate.

In addition, in the squirrel-cage motor rotor 200 of the present embodiment, chromium molybdenum steel which has a coefficient of thermal expansion close to that of the reinforcement covers 26 made of stainless steel is used for the reinforcement rings 29. In addition, the holding ring 7 is attached to the outer circumferential surfaces of the short-circuit ring 5 and the reinforcement cover 26 by shrink fit, and thermal expansion and deformation of the short-circuit ring 5 outward in the radial direction due to temperature increase are hindered. In addition, the reinforcement ring 29 is attached to the inner circumferential surfaces of the short-circuit ring 5 and the reinforcement cover 26 by shrink fit.

That is, the outer circumferential surface of the reinforcement cover 26 is tightened by the holding ring 7, and the inner circumferential surface of the reinforcement cover 26 is pressed by the reinforcement ring 29. In addition, the outer circumferential surface of the reinforcement ring 29 is tightened by the short-circuit ring 5 and the reinforcement cover 26.

Therefore, in the case where the rotor core 1 and the reinforcement ring 29 are attached to the rotor shaft 2 by shrink fit, even if heating that exceeds an assumed temperature is performed or the temperature of the rotor 200 becomes high due to driving of the squirrel-cage motor, the reinforcement cover 26 and the reinforcement ring 29 are prevented from being loosened to be detached or displaced.

The axial-direction projections 5a of the short-circuit ring 5 are fitted to the short-circuit ring projection insertion holes 26c formed in the reinforcement cover 26. Therefore, when heating is performed for shrink fit to the rotor shaft 2 or the temperature becomes high due to driving of the squirrel-cage motor, the axial-direction projections 5a expand so that the reinforcement cover 26 is strongly held by the short-circuit ring 5, and thus, also in this aspect, the reinforcement cover 26 is prevented from being detached or displaced.

In the squirrel-cage motor rotor of the present embodiment, the components to be attached by shrink fit may be attached by another tightening method such as press fit. That is, the attachment only needs to be made by interference fit.

Embodiment 3

Figure 7:
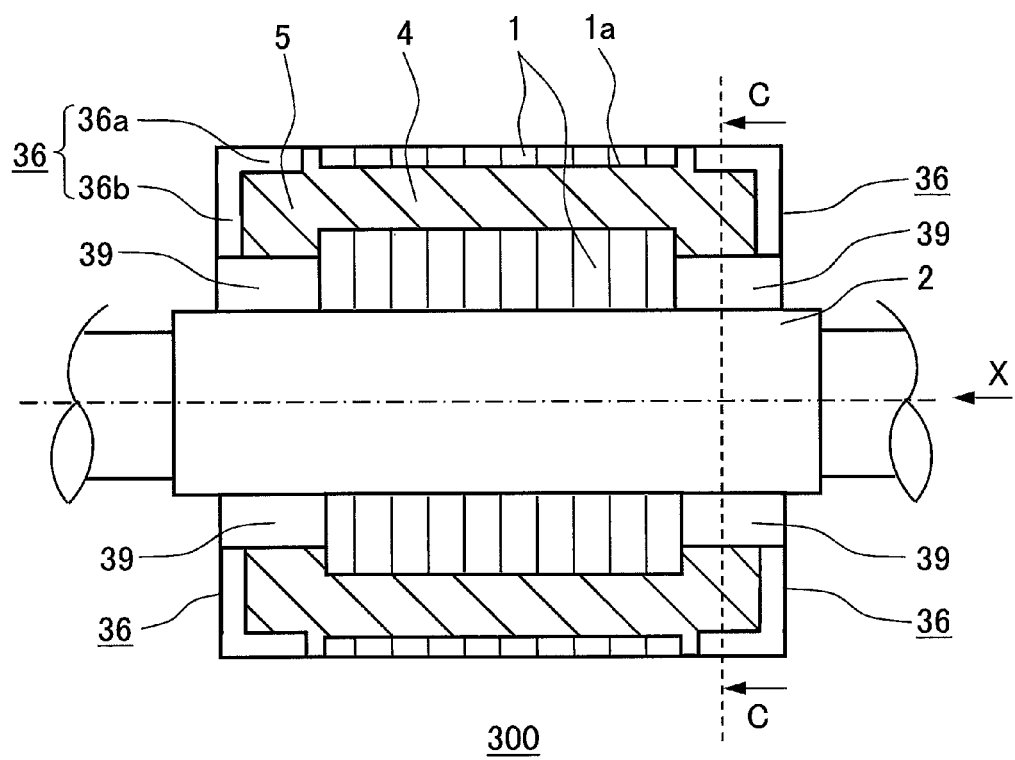
FIG. 7 is a schematic sectional view of a squirrel-cage motor rotor according to embodiment 3 of the present invention.

FIG. 7 is a schematic sectional view of a squirrel-cage motor rotor according to embodiment 3 of the present invention.

Figure 8:
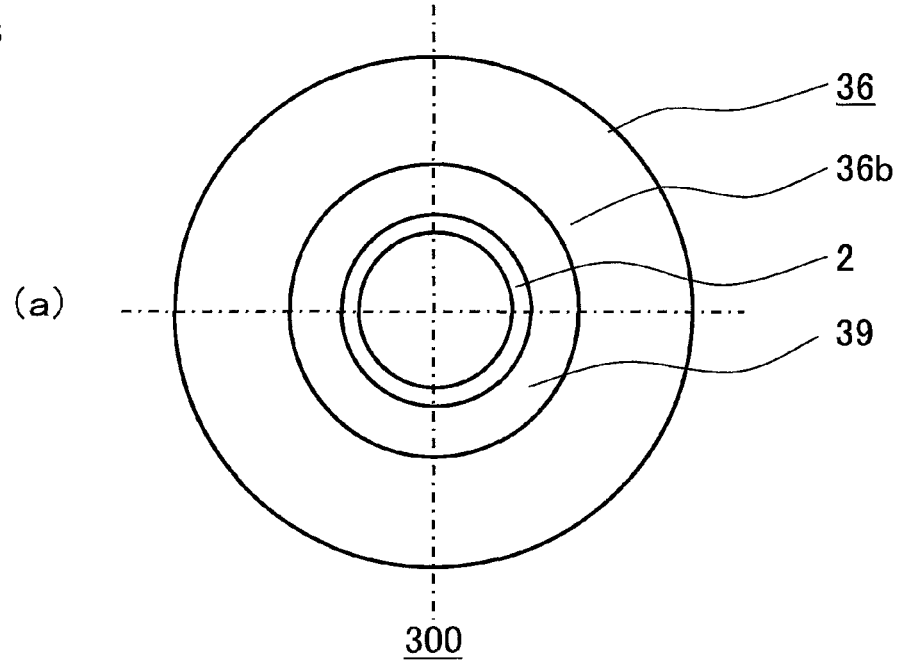
FIG. 8 is a schematic plan view (a) as seen from the direction indicated by an arrow X and a schematic view (b) of a C-C cross section, of the squirrel-cage motor rotor according to embodiment 3 of the present invention shown in FIG. 7.
Figure 8:
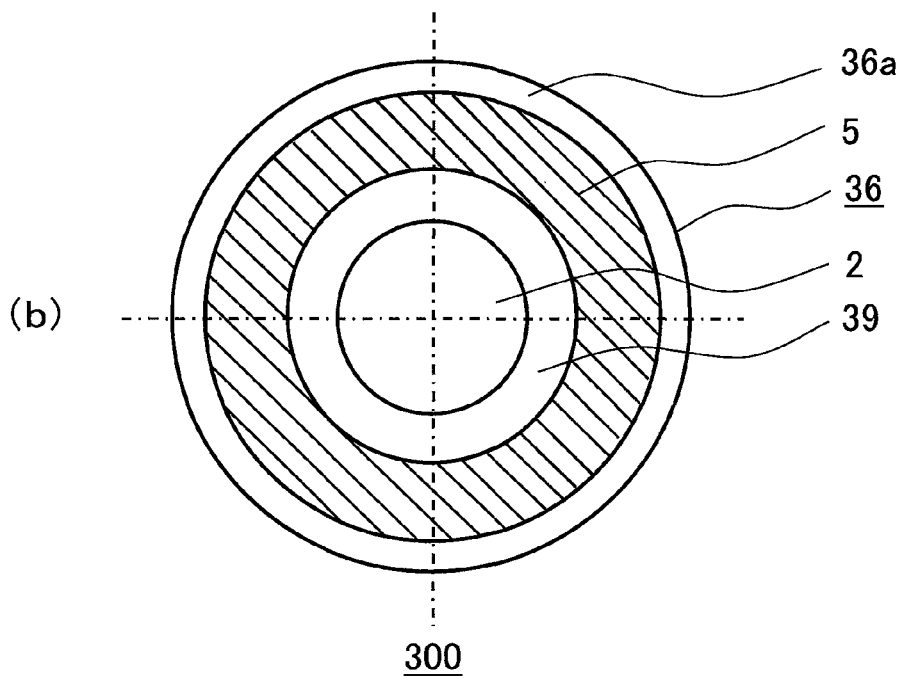

FIG. 8 is a schematic plan view (a) as seen from the direction indicated by an arrow X and a schematic view (b) of a C-C cross section, of the squirrel-cage motor rotor according to embodiment 3 of the present invention shown in FIG. 7.

FIG. 8 shows a plan view and a sectional view of the entirety of a squirrel-cage motor rotor 300 of the present embodiment.

As shown in FIG. 7 and FIG. 8, the squirrel-cage motor rotor 300 of the present embodiment includes a cylindrical rotor core 1 formed by stacking electromagnetic steel sheets, conductor bars 4 respectively filling a plurality of slot holes 1a which penetrate the rotor core 1 in the axial direction and are arranged at regular intervals along the circumferential direction of the rotor core 1, short-circuit rings 5 connected to ends of the conductor bars 4, reinforcement covers 36 contacting with axial-direction-end surfaces of the short-circuit rings 5 and having a hole at the center, and a rotor shaft 2 to which the rotor core 1 is attached.

In the squirrel-cage motor rotor 300 of the present embodiment, the short-circuit rings 5 are integrated with all the conductor bars 4 arranged at regular intervals along the circumferential direction of the rotor core 1, and are provided at both-side ends of the conductor bars 4 so as to contact with the axial-direction-end surfaces of the rotor core 1.

Each reinforcement cover 36 is a cylindrical member having a body portion 36a and an annular flange portion 36b vertically protruding from the inner circumferential surface on one axial direction-end side of the body portion 36a. The shape of a cross section perpendicular to the circumferential direction of the cylindrical member is a reversed L-shape.

Regarding the reinforcement cover 36, the inner circumferential surface of the body portion 36a is in contact with the outer circumferential surface of the short-circuit ring 5, and the axially-inner-side surface of the flange portion 36b is in contact with the axial-direction-end surface of the short-circuit ring 5.

A reinforcement ring 39 is attached to the rotor shaft 2 such that the outer circumferential surface thereof is in contact with the inner circumferential surface of the short-circuit ring 5 and the inner circumferential surface of the flange portion 36b of the reinforcement cover 36, and the axially-inner-side end surface thereof is in contact with the axial-direction-end surface of the rotor core 1.

In the squirrel-cage motor rotor 300 of the present embodiment, chromium molybdenum steel (SCM) is used for the reinforcement covers 36, and stainless steel which is a nonmagnetic material is used for the reinforcement rings 39.

The materials of the other components are the same as in embodiment 1.

Next, an example of the method for manufacturing the squirrel-cage motor rotor 300 of the present embodiment will be described.

In the manufacturing of the squirrel-cage motor rotor 300 of the present embodiment, the rotor core 1 is set to a temporary shaft component. Next, a sealed body in which the rotor core 1 is sealed by aluminum is made. Next, a sprue shaped portion and a runner shaped portion are cut from the sealed body, and then the temporary shaft component is detached.

Next, the outer circumferential portion of each short-circuit ring 5 is cut by a lathe. The outer diameter of the short-circuit ring 5 after the cutting is greater than the inner diameter of the body portion 36a of the reinforcement cover 36 by an amount corresponding to the shrink-fit allowance. Next, the reinforcement cover 36 is attached to the outer circumferential surface of the short-circuit ring 5 by shrink fit.

Next, the inner circumferential surface of the flange portion 36b of each reinforcement cover 36 and the inner circumferential surface of each short-circuit ring 5 are cut together by a lathe so that their inner diameters become equal to each other. The inner diameter of the short-circuit ring 5 and the inner diameter of the flange portion 36b of the reinforcement cover 36 after the cutting are smaller than the outer diameter of the reinforcement ring 39 by an amount corresponding to the shrink-fit allowance. Next, the reinforcement ring 39 is attached to the inner circumferential surface of each short-circuit ring 5 and the inner circumferential surface of the flange portion 36b of each reinforcement cover 36 by shrink fit.

Next, the inner circumferential surface of the rotor core 1 and the inner circumferential surface of each reinforcement ring 39 are cut together by a lathe so that their inner diameters become equal to each other. At this time, the inner diameter of the rotor core 1 and the inner diameter of each reinforcement ring 39 are made smaller than the outer diameter of the rotor shaft 2 by an amount corresponding to the shrink-fit allowance. Next, the rotor core 1 and the reinforcement ring 39 are attached to the rotor shaft 2 at the same time by shrink fit, whereby the squirrel-cage motor rotor 300 is completed.

Also in the squirrel-cage motor rotor 300 of the present embodiment, expansion and deformation of the short-circuit ring 5 due to at least one of temperature increase and centrifugal force load are restrained in three directions of the inner circumferential surface side, the outer circumferential surface side, and the end surface side of the short-circuit ring 5, by the reinforcement ring 39 and the reinforcement cover 36, whereby compressive stress is constantly applied to the short-circuit ring 5. Thus, a difference in stress on the short-circuit ring 5 between the time in which the motor is driven and the time in which the motor is stopped is small.

Therefore, also in the squirrel-cage motor rotor 300 of the present embodiment, the amplitude of stress generated on the short-circuit ring 5 by repetition of driving and stop of the motor can be reduced, and the life against metal fatigue of the short-circuit ring 5 can be improved.

In the squirrel-cage motor rotor 300 of the present embodiment, compressive stress applied to the short-circuit ring 5 can be estimated from a set value of the shrink-fit allowance between the short-circuit ring 5 and the reinforcement ring 39, and the amplitude of stress applied to the short-circuit ring 5 can be adjusted depending on the specifications of the squirrel-cage motor. Therefore, there is an advantage that a sufficient life against metal fatigue of the short-circuit ring 5 can be kept irrespective of variation in the specifications such as the rotor size or the rotation rate.

In the squirrel-cage motor rotor 300 of the present embodiment, the reinforcement cover 36 is attached to the outer circumferential surface of the short-circuit ring 5 by shrink fit, and the inner circumferential surface of the body portion 36a of the reinforcement cover 36 is in contact with the outer circumferential surface of the short-circuit ring 5. Therefore, the reinforcement cover 36 has a function as a holding ring, and thermal expansion and deformation of the short-circuit ring 5 outward in the radial direction due to temperature increase is hindered. In addition, the reinforcement ring 39 is attached to the inner circumferential surfaces of the short-circuit ring 5 and the flange portion 36b of the reinforcement cover 36 by shrink fit.

That is, the inner circumferential surface of the body portion 36a of the reinforcement cover 36 is pressed by the short-circuit ring 5, and the inner circumferential surface of the flange portion 36b of the reinforcement cover 36 is pressed by the reinforcement ring 39. In addition, the outer circumferential surface of the reinforcement ring 39 is tightened by the short-circuit ring 5 and the flange portion 36b of the reinforcement cover 36.

Therefore, in the case where the rotor core 1 and the reinforcement ring 39 are attached to the rotor shaft 2 by shrink fit, even if heating that exceeds an assumed temperature is performed or the temperature of the rotor 300 becomes high due to driving of the squirrel-cage motor, the reinforcement cover 36 and the reinforcement ring 39 are prevented from being loosened to be detached or displaced.

The reinforcement cover 36 has a function as a holding ring, and the holding ring can be omitted. Therefore, the number of components can be decreased.

There is no hole in the flange portion 36b of the reinforcement cover 36, and the number of processing steps can be decreased. Therefore, the manufacturing cost can be reduced.

Before the reinforcement cover 36 and the reinforcement ring 39 are attached, the inner circumferential surface, the outer circumferential surface, and the axial-direction-end surface of the short-circuit ring 5 can be confirmed. Therefore, the casting quality of the short-circuit ring 5 can be easily checked.

In the squirrel-cage motor rotor of the present embodiment, the components to be attached by shrink fit may be attached by another tightening method such as press fit. That is, the attachment only needs to be made by interference fit.

Embodiment 4

Figure 9:
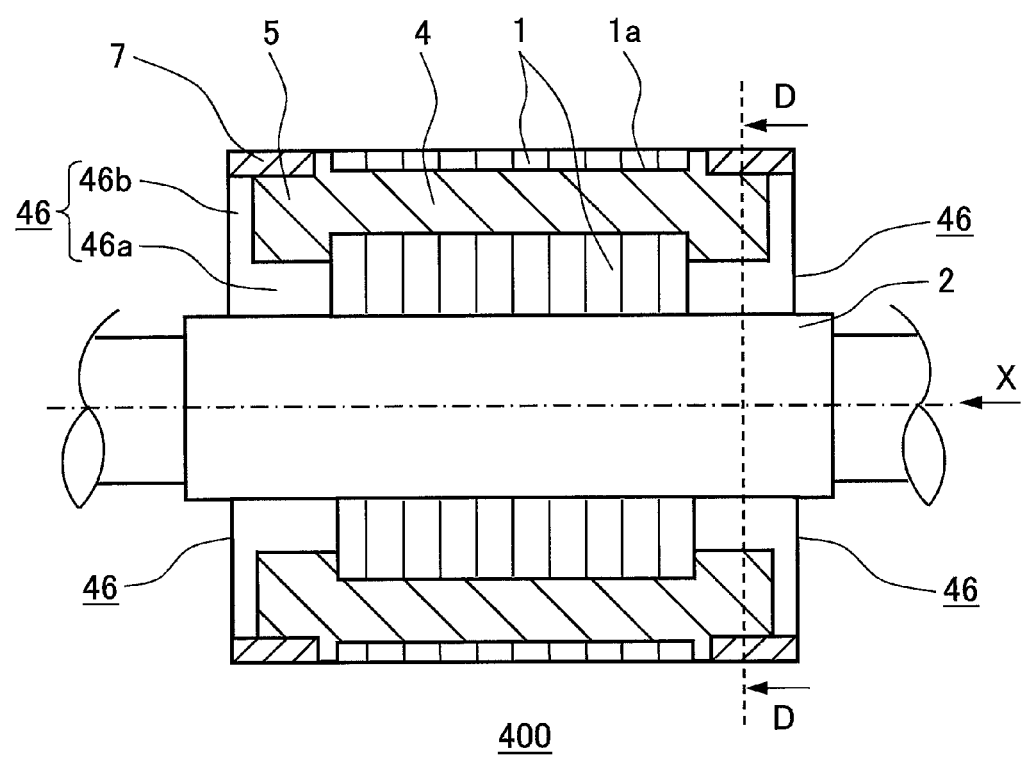
FIG. 9 is a schematic sectional view of a squirrel-cage motor rotor according to embodiment 4 of the present invention.

FIG. 9 is a schematic sectional view of a squirrel-cage motor rotor according to embodiment 4 of the present invention.

Figure 10:
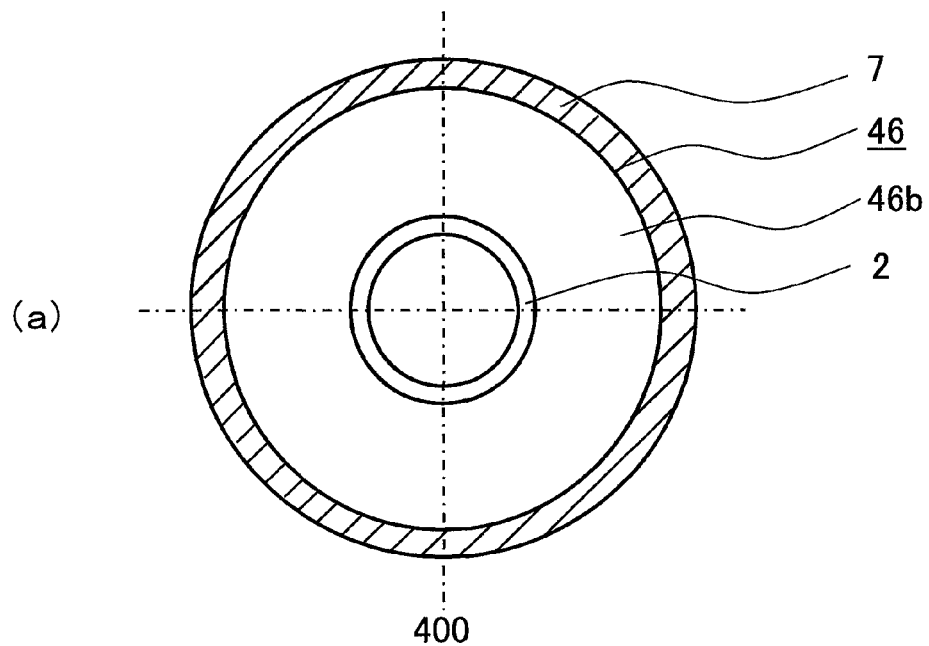
FIG. 10 is a schematic plan view (a) as seen from the direction indicated by an arrow X and a schematic view (b) of a D-D cross section, of the squirrel-cage motor rotor according to embodiment 4 of the present invention shown in FIG. 9.
Figure 10:
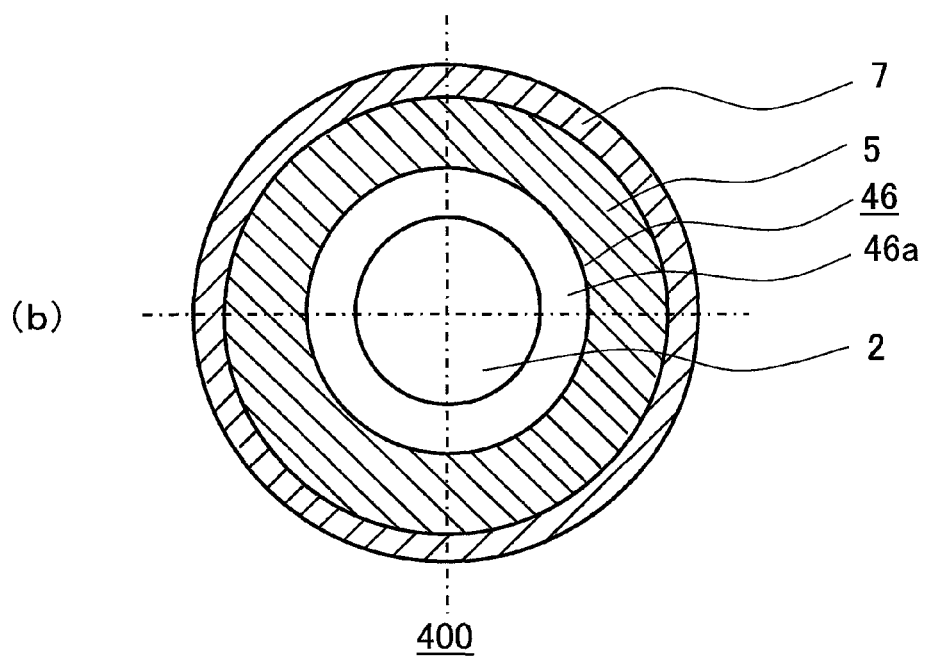

FIG. 10 is a schematic plan view (a) as seen from the direction indicated by an arrow X and a schematic view (b) of a D-D cross section, of the squirrel-cage motor rotor according to embodiment 4 of the present invention shown in FIG. 9.

FIG. 10 shows a plan view and a sectional view of the entirety of a squirrel-cage motor rotor 400 of the present embodiment.

As shown in FIG. 9 and FIG. 10, the squirrel-cage motor rotor 400 of the present embodiment includes a cylindrical rotor core 1 formed by stacking electromagnetic steel sheets, conductor bars 4 respectively filling a plurality of slot holes 1a which penetrate the rotor core 1 in the axial direction and are arranged at regular intervals along the circumferential direction of the rotor core 1, short-circuit rings 5 connected to ends of the conductor bars 4, reinforcement covers 46 contacting with axial-direction-end surfaces of the short-circuit rings 5 and having a hole at the center; and a rotor shaft 2 to which the rotor core 1 is attached.

In the squirrel-cage motor rotor 400 of the present embodiment, the short-circuit rings 5 are integrated with all the conductor bars 4 arranged at regular intervals along the circumferential direction of the rotor core 1, and are provided at both-side ends of the conductor bars 4 so as to contact with the axial-direction-end surfaces of the rotor core 1.

Each reinforcement cover 46 is a cylindrical member having a body portion 46a and an annular flange portion 46b vertically protruding from the outer circumferential surface on one axial-direction-end side of the body portion 46a. The shape of a cross section perpendicular to the circumferential direction of the cylindrical member is an L-shape, and the reinforcement covers 46 are attached to the rotor shaft 2.

Regarding the reinforcement cover 46, the outer circumferential surface of the body portion 46a is in contact with the inner circumferential surface of the short-circuit ring 5, the axially-inner-side end surface of the body portion 46a is in contact with the axially-end surface of the rotor core 1, the inner circumferential surface of the body portion 46a is in contact with the outer circumferential surface of the rotor shaft 2, and the axially-inner-side surface of the flange portion 46b is in contact with the axially-end surface of the short-circuit ring 5.

A holding ring 7 is provided such that the inner circumferential surface thereof is in contact with the outer circumferential surface of the short-circuit ring 5 and the outer circumferential surface of the flange portion 46b of the reinforcement cover 46.

In the squirrel-cage motor rotor 400 of the present embodiment, stainless steel which is a nonmagnetic material is used for the reinforcement covers 46. The materials of the other components are the same as in embodiment 1.

Next, an example of the method for manufacturing the squirrel-cage motor rotor 400 of the present embodiment will be described.

In the manufacturing of the squirrel-cage motor rotor 400 of the present embodiment, the rotor core 1 is set to a temporary shaft component. Next, a sealed body in which the rotor core 1 is sealed by aluminum is made. Next, a sprue shaped portion and a runner shaped portion are cut from the sealed body, and then the temporary shaft component is detached.

Next, the inner circumferential surface of each short-circuit ring 5 is cut by a lathe. At this time, the inner diameter of the short-circuit rings 5 is made smaller than the outer diameter of the body portion 46a of the reinforcement cover 46 by an amount corresponding to the shrink-fit allowance. Next, the reinforcement cover 46 is attached to the inner circumferential surface of the short-circuit rings 5 by shrink fit.

Next, the outer circumferential portion of the flange portion 46b of each reinforcement cover 46 and the outer circumferential portion of each short-circuit ring 5 are cut together by a lathe so that their outer diameters become equal to each other. At this time, the outer diameter of the flange portion 46b of the reinforcement cover 46 and the outer diameter of the short-circuit ring 5 are made greater than the inner diameter of the holding ring 7 by an amount corresponding to the shrink-fit allowance. Next, the holding ring 7 is attached to the outer circumferential surfaces of the reinforcement cover 46 and the short-circuit ring 5 which have outer diameters equal to each other, by shrink fit.

Next, the inner circumferential surface of the rotor core 1 and the inner circumferential surface of each reinforcement cover 46 are cut together by a lathe so that their inner diameters become equal to each other. At this time, the inner diameter of the rotor core 1 and the inner diameter of each reinforcement cover 46 are made smaller than the outer diameter of the rotor shaft 2 by an amount corresponding to the shrink-fit allowance. Next, the rotor core 1 and the reinforcement covers 46 are attached to the rotor shaft 2 at the same time by shrink fit, whereby the squirrel-cage motor rotor 400 is completed.

Also in the squirrel-cage motor rotor 400 of the present embodiment, expansion and deformation of the short-circuit ring 5 due to at least one of temperature increase and centrifugal force load are restrained in three directions of the outer circumferential surface side, the inner circumferential surface side, and the end surface side of the short-circuit ring 5, by the holding ring 7 and the reinforcement cover 46, whereby compressive stress is constantly applied to the short-circuit ring 5. Thus, a difference in stress on the short-circuit ring 5 between the time in which the motor is driven and the time in which the motor is stopped is small.

Therefore, also in the squirrel-cage motor rotor 400 of the present embodiment, the amplitude of stress generated on the short-circuit ring 5 by repetition of driving and stop of the motor can be reduced, and the life against metal fatigue of the short-circuit ring 5 can be improved.

Also in the squirrel-cage motor rotor 400 of the present embodiment, compressive stress applied to the short-circuit ring 5 can be estimated from a set value of the shrink-fit allowance between the short-circuit ring 5 and the body portion 46a of the reinforcement cover 46, and the amplitude of stress applied to the short-circuit ring 5 can be adjusted depending on the specifications of the squirrel-cage motor. Therefore, there is an advantage that a sufficient life against metal fatigue of the short-circuit ring 5 can be kept irrespective of variation in the specifications such as the rotor size or the rotation rate.

In addition, in the squirrel-cage motor rotor 400 of the present embodiment, since the holding ring 7 is attached to the outer circumferential surfaces of the short-circuit ring 5 and the flange portion 46b of the reinforcement cover 46 by shrink fit, thermal expansion and deformation of the short-circuit ring 5 outward in the radial direction due to temperature increase are hindered. In addition, the reinforcement cover 46 is attached to the inner circumferential surface of the short-circuit ring 5 by shrink fit.

That is, the outer circumferential surface of the flange portion 46b of the reinforcement cover 46 is tightened by the holding ring 7, and the outer circumferential surface of the body portion 46a of the reinforcement cover 46 is tightened by the short-circuit ring 5.

Therefore, in the case where the rotor core 1 and the reinforcement cover 46 are attached to the rotor shaft 2 by shrink fit, even if heating that exceeds an assumed temperature is performed or the temperature of the rotor 400 becomes high due to driving of the squirrel-cage motor, the reinforcement cover 46 is prevented from being detached or displaced.

There is no hole in the flange portion 46b of the reinforcement cover 46, and the number of processing steps can be decreased. Therefore, the manufacturing cost can be reduced.

Before the reinforcement cover 46 and the holding ring 7 are attached, the inner circumferential surface, the outer circumferential surface, and the axial-direction-end surface of the short-circuit ring 5 can be confirmed. Therefore, the casting quality of the short-circuit ring 5 can be easily checked.

In the squirrel-cage motor rotor of the present embodiment, the components to be attached by shrink fit may be attached by another tightening method such as press fit. That is, the attachment only needs to be made by interference fit.

Embodiment 5

Figure 11:
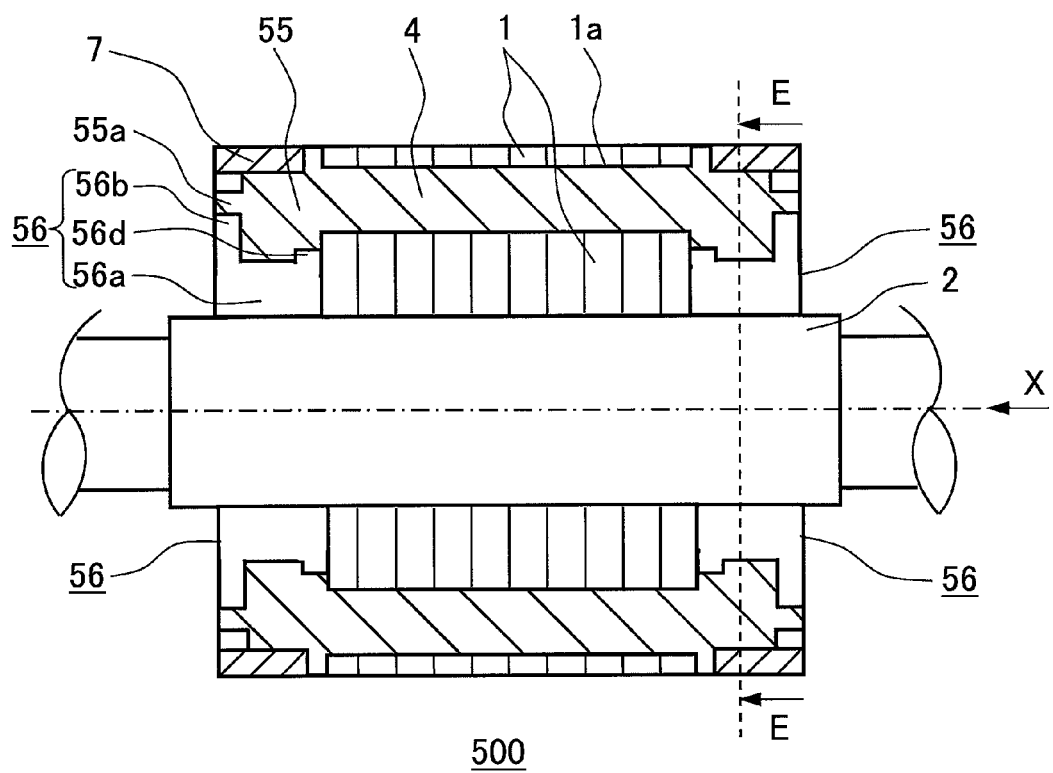
FIG. 11 is a schematic sectional view of a squirrel-cage motor rotor according to embodiment 5 of the present invention.

FIG. 11 is a schematic sectional view of a squirrel-cage motor rotor according to embodiment 5 of the present invention.

Figure 12:
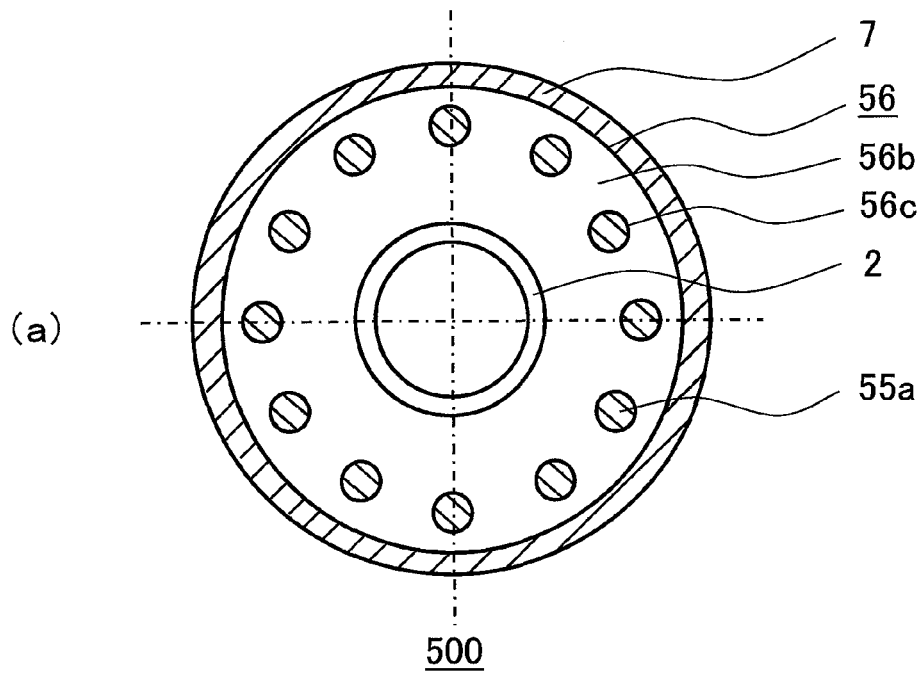
FIG. 12 is a schematic plan view (a) as seen from the direction indicated by an arrow X and a schematic view (b) of an E-E cross section, of the squirrel-cage motor rotor according to embodiment 5 of the present invention shown in FIG. 11.
Figure 12:
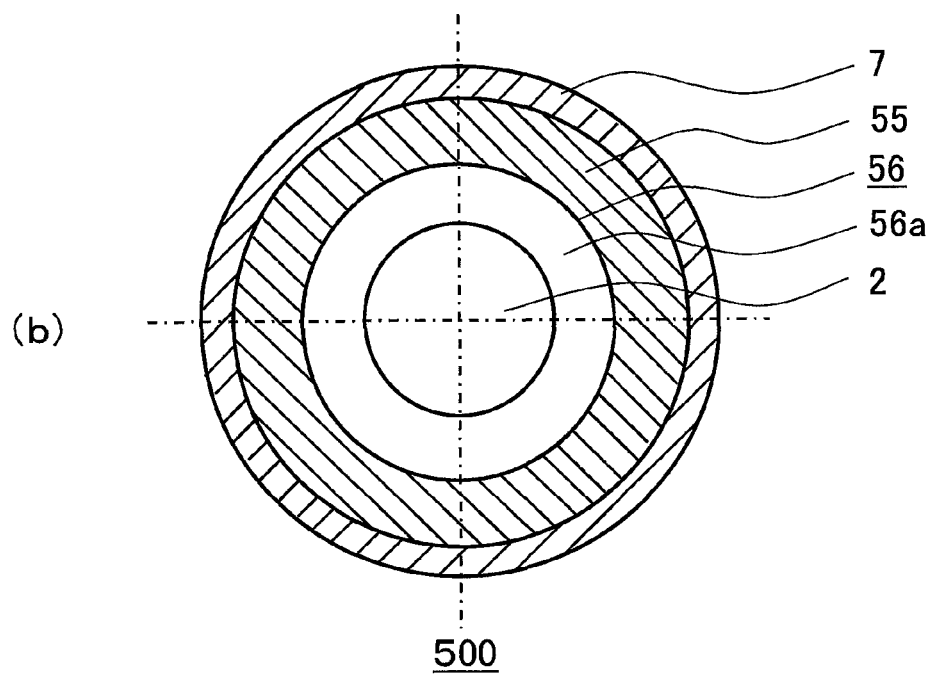

FIG. 12 is a schematic plan view (a) as seen from the direction indicated by an arrow X and a schematic view (b) of an E-E cross section, of the squirrel-cage motor rotor according to embodiment 5 of the present invention shown in FIG. 11.

FIG. 12 shows a plan view and a sectional view of the entirety of a squirrel-cage motor rotor 500 of the present embodiment.

As shown in FIG. 11 and FIG. 12, a squirrel-cage motor rotor 500 of the present embodiment is the same as in the squirrel-cage motor rotor 100 of embodiment 1 except that the shapes of reinforcement covers 56 and short-circuit rings 55 are different.

As shown in FIG. 11, each reinforcement cover 56 of the present embodiment is a cylindrical member having a body portion 56a, an annular first flange portion 56b vertically protruding from the outer circumferential surface on one axial-direction-end side of the body portion 56a, and an annular second flange portion 56d vertically protruding from the outer circumferential surface on the other axial-direction-end side of the body portion 56a, and the reinforcement cover 56 is attached to the rotor shaft 2.

In the first flange portion 56b, at positions opposed to the conductor bars 4, short-circuit ring projection insertion holes 56c are formed into which axial-direction projections 55a of the short-circuit ring 55 are inserted.

The first flange portion 56b is formed on the axially-outer side of the body portion 56a, and the second flange portion 56d is formed on the axially-inner side of the body portion 56a.

The distance from the outer circumferential surface of the body portion 56a to the outer circumferential surface of the second flange portion 56d is shorter than the distance from the outer circumferential surface of the body portion 56a to the outer circumferential surface of the first flange portion 56b, and is shorter than the distance from the outer circumferential surface of the body portion 56a to the innermost position of the conductor bar 4 in the radial direction.

The squirrel-cage motor rotor 500 of the present embodiment provides the same effect as that of the squirrel-cage motor rotor 100 of embodiment 1.

Further, since each reinforcement cover 56 has the first flange portion 56b and the second flange portion 56d, when the short-circuit ring 55 made of aluminum and having a greater coefficient of thermal expansion than the other parts expands due to temperature increase, the first flange portion 56b of the reinforcement cover 56 is held by the short-circuit ring 55. When the short-circuit ring 55 is cooled and contracted, the second flange portion 56d of the reinforcement cover 56 is held by the short-circuit ring 55.

That is, in the squirrel-cage motor rotor 500 of the present embodiment, not only when the temperature increases but also when the squirrel-cage motor is stopped and the rotor is cooled, the reinforcement cover 56 is properly held in the axial direction by the short-circuit ring 55.

Regarding the reinforcement cover 56 of the present embodiment, the distance from the outer circumferential surface of the body portion 56a to the outer circumferential surface of the second flange portion 56d is shorter than the distance from the outer circumferential surface of the body portion 56a to the outer circumferential surface of the first flange portion 56b, and is shorter than the distance from the outer circumferential surface of the body portion 56a to the innermost position of the conductor bar 4 in the radial direction. Therefore, when the conductor bars 4 and the short-circuit rings 55 are integrally molded by casting, the second flange portion 56d does not hamper flow of molten metal.

Embodiment 6

Figure 13:
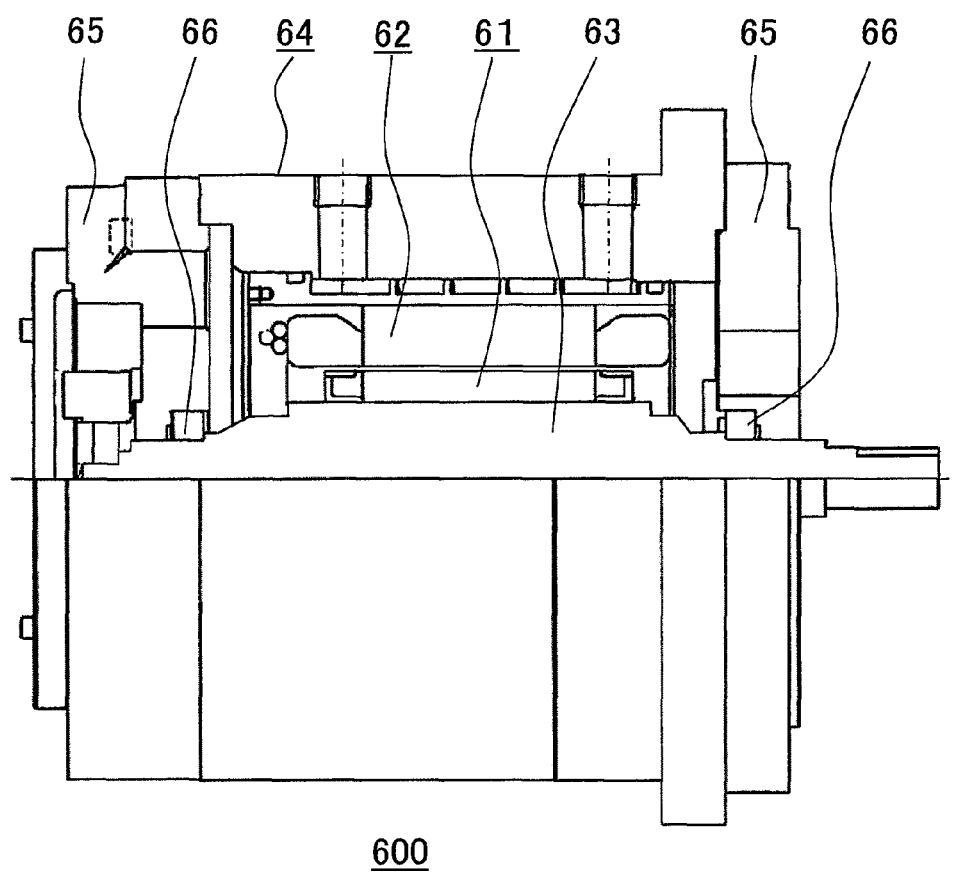
FIG. 13 is a schematic side view of a squirrel-cage motor according to embodiment 6 of the present invention.

FIG. 13 is a schematic side view of a squirrel-cage motor according to embodiment 6 of the present invention.

In FIG. 13, the upper half of a frame 64 of a squirrel-cage motor 600 is shown transparently.

As shown in FIG. 13, the squirrel-cage motor 600 of the present embodiment 6 includes a rotor 61, a stator 62 provided outside the rotor 61, and a frame 64. The inner circumferential surface of the stator 62 and the outer circumferential surface of the rotor 61 are opposed to each other with a certain gap therebetween.

A rotor shaft 63 of the rotor 61 is rotatably held by bearings 66 provided to end walls 65 at both axial-direction-ends of the frame 64.

In the squirrel-cage motor 600 of the present embodiment, any one of the rotors of embodiments 1 to 5 is used as the rotor 61.

In the squirrel-cage motor 600 of the present embodiment, since any one of the rotors of embodiments 1 to 5 is used as the rotor 61, disadvantages that would occur on the rotor during usage are decreased, and thus the reliability is improved.

It is noted that, within the scope of the present invention, the above embodiments may be freely combined with each other, or each of the above embodiments may be modified or abbreviated appropriately.

INDUSTRIAL APPLICABILITY

In the squirrel-cage motor rotor of the present invention, the life against metal fatigue of the short-circuit ring is improved, and the reinforcement cover can be prevented from being detached or displaced. Therefore, the squirrel-cage motor rotor is applicable to squirrel-cage motors that rotate at high speed and require high reliability. The squirrel-cage motor using this rotor is applicable to machines that frequently perform repetitive operation.

The invention claimed is:
1. A squirrel-cage motor rotor comprising:
   conductor bars respectively filling a plurality of slot holes penetrating a rotor core in an axial direction and provided at regular intervals along a circumferential direction of the rotor core;
   short-circuit rings connected to ends of the conductor bars; and
   reinforcement covers having axial-direction surfaces which come in contact with axial-direction-end surfaces of the short-circuit rings, the reinforcement covers having a hole at a center, wherein
   the conductor bars and the short-circuit rings are integrally formed by casting,
   the reinforcement covers are cylindrical members having body portions and annular flange portions vertically protruding from outer circumferential surfaces on one axial-direction-end side of the body portions,
   outer circumferential surfaces of the body portions and inner circumferential surfaces of the short-circuit rings are in contact with each other, axial-direction surfaces of the flange portions are in contact with the axial-direction-end surfaces of the short-circuit rings, and holding rings are attached by interference fit such that inner circumferential surfaces thereof are in contact with outer circumferential surfaces of the flange portions and outer circumferential surfaces of the short-circuit rings.

2. The squirrel-cage motor rotor according to claim 1, wherein the reinforcement covers are enclosed by casting in the short-circuit rings, and the flange portions have short-circuit ring projection insertion holes formed at positions opposed to the conductor bars.

3. The squirrel-cage motor rotor according to claim 1, wherein the short-circuit rings are attached to the body portions by interference fit.

4. The squirrel-cage motor rotor according to claim 1, wherein inner circumferential surfaces of the reinforcement covers and an inner circumferential surface of the rotor core are attached so as to come in contact with an outer circumferential surface of a rotor shaft by interference fit.

5. The squirrel-cage motor rotor according to claim 1, wherein the reinforcement covers have annular flange portions vertically protruding from outer circumferential surfaces on another axial-direction-end side of the body portions.

6. A squirrel-cage motor comprising:

the squirrel-cage motor rotor according to claim 1; and a stator provided so as to be opposed to the rotor.

7. A squirrel-cage motor rotor comprising:

conductor bars respectively filling a plurality of slot holes penetrating a rotor core in an axial direction and provided at regular intervals along a circumferential direction of the rotor core;

short-circuit rings connected to ends of the conductor bars; and reinforcement covers having axial-direction surfaces which come in contact with axial-direction-end surfaces of the short-circuit rings, the reinforcement covers having a hole at a center, wherein the conductor bars and the short-circuit rings are integrally formed by casting, the reinforcement covers have, in a plan view, a doughnut disk shape which is the same as a shape of the axial-direction-end surfaces of the short-circuit rings, and have short-circuit ring projection insertion holes formed at positions opposed to the conductor bars, reinforcement rings are attached by interference fit such that outer circumferential surfaces thereof are in contact with inner circumferential surfaces of the reinforcement covers and inner circumferential surfaces of the short-circuit rings, and holding rings are attached by interference fit such that inner circumferential surfaces thereof are in contact with outer circumferential surfaces of the reinforcement covers and outer circumferential surfaces of the short-circuit rings.

8. The squirrel-cage motor rotor according to claim 7, wherein inner circumferential surfaces of the reinforcement rings and an inner circumferential surface of the rotor core are attached so as to come in contact with an outer circumferential surface of a rotor shaft by interference fit.

9. A squirrel-cage motor comprising:

the squirrel-cage motor rotor according to claim 7; and a stator provided so as to be opposed to the rotor.

10. A squirrel-cage motor rotor comprising:

conductor bars respectively filling a plurality of slot holes penetrating a rotor core in an axial direction and provided at regular intervals along a circumferential direction of the rotor core;

short-circuit rings connected to ends of the conductor bars; and reinforcement covers having axial-direction surfaces which come in contact with axial-direction-end surfaces of the short-circuit rings, the reinforcement covers having a hole at a center, wherein the conductor bars and the short-circuit rings are integrally formed by casting, the reinforcement covers are cylindrical members having body portions and annular flange portions vertically protruding from inner circumferential surfaces on one axial-direction-end side of the body portions, and are attached by interference fit such that axial-direction surfaces of the flange portions are in contact with the axial-direction-end surfaces of the short-circuit rings, and inner circumferential surfaces of the body portions are in contact with outer circumferential surfaces of the short-circuit rings, and reinforcement rings are attached by interference fit such that outer circumferential surfaces thereof are in contact with inner circumferential surfaces of the flange portions and inner circumferential surfaces of the short-circuit rings.

11. The squirrel-cage motor rotor according to claim 10, wherein inner circumferential surfaces of the reinforcement rings and an inner circumferential surface of the rotor core are attached so as to come in contact with an outer circumferential surface of a rotor shaft by interference fit.

12. A squirrel-cage motor comprising:

the squirrel-cage motor rotor according to claim 10; and a stator provided so as to be opposed to the rotor.

* * * * *